US005705448A

United States Patent [19]
Sambrook et al.

[11] Patent Number: 5,705,448
[45] Date of Patent: Jan. 6, 1998

[54] PRODUCTION OF POROUS ARTICLES

[75] Inventors: Rodney Martin Sambrook; Robert Terence Smith, both of Sheffield, Great Britain

[73] Assignee: Dytech Corporation Limited, Sheffield, Great Britain

[21] Appl. No.: 737,120

[22] PCT Filed: May 10, 1995

[86] PCT No.: PCT/GB95/01063

§ 371 Date: Nov. 4, 1996

§ 102(e) Date: Nov. 4, 1996

[87] PCT Pub. No.: WO95/30633

PCT Pub. Date: Nov. 16, 1995

[30] Foreign Application Priority Data

May 10, 1994 [GB] United Kingdom ............... 9409312

[51] Int. Cl.⁶ ........................... C04B 38/00; C04B 38/10
[52] U.S. Cl. .................... 501/80; 501/84; 501/85; 252/306; 252/307; 252/310; 252/350; 264/42; 264/51

[58] Field of Search ................... 501/80, 81, 84, 501/85; 252/306, 307, 310, 350; 264/42, 51

[56] References Cited

U.S. PATENT DOCUMENTS 5,082,607  1/1992  Tange et al. .
5,563,106  10/1996  Binner et al. ............... 501/80

FOREIGN PATENT DOCUMENTS 102029     3/1984  European Pat. Off. .
1964000    7/1970  Germany .
WO 93/04013  3/1993  WIPO .

*Primary Examiner*—Michael Marcheschi
*Attorney, Agent, or Firm*—Caesar, Rivise, Bernstein, Cohen & Pokotilow, Ltd.

[57] ABSTRACT

A gas generating substance is added to an aqueous dispersion containing refractory particles and a polymerizable monomer and the pressure and/or temperature are adjusted so that the substance generates the gas before the polymerization gets underway; to control the formation of pores.

8 Claims, No Drawings

PRODUCTION OF POROUS ARTICLES

This application is pursuant to 35 U.S.C. § 371 entitled to the priority date of International Application No. PCT/GB95/01063, filed May 10, 1995.

The invention relates to the production of porous articles and is an improvement in or modification of the invention disclosed in our patent application PCT/GB92/01493 published under number WO 93/04103 on Mar. 4, 1993. All of the disclosure of that specification is hereby incorporated herein.

The method described and claimed in the earlier application comprises the step of forming a dispersion comprising particles of refractory material in a liquid carrier, introducing gas into the dispersion and removing the liquid carrier to provide a solid article having pores derived from the bubbles of gas, characterised by controlling the critical viscosity of the dispersion to be from about 5 mPa.s, (the level below which the entrapped gas bubbles will tend to escape), to about 1000 mPa.s, (the level above which the entrapped gas bubbles cannot be introduced). The critical viscosity is preferably from about 20 mPa.s to about 250 mPa.s. After the gas is introduced the liquid carrier is removed, typically water is driven off by heat.

One optional step is the inclusion of a polymerisable monomer to have an effect when the liquid carrier is removed. Soluble acrylates and acrylamides are given as suitable additives and they are polymerised by the use of catalysts and/or heat.

There may be a need in certain circumstances for a porous article in which the pores are highly interconnected. This invention is based on the appreciation that by carrying out foaming in a defined way such articles or articles having predetermined structure of pores can readily be formed.

According to the invention in one aspect there is provided a method of making a porous refractory article, the method comprising the steps of:

forming an aqueous dispersion of refractory particles including a polymerisable monomer component which on polymerisation generates an exotherm adding a thermally decomposable gas generating substance adding agents such as initiator and/or catalyst to cause the polymerisation adjusting the temperature and/or pressure so that the gas generating substance generates the gas before or during the initial stage of polymerisation of the monomer component whereby the gas forms bubbles which under the heat of the exotherm interconnect to form an interconnected open pore structure.

The thermally decomposable gas generating substance will, under the appropriate conditions, generate the gas in situ. The temperature at which the gas is generated depends on the substance in question, and the overall conditions, e.g. temperature and pressure. The substance is preferably one which after decomposition leaves no residues which in the context tend to contaminate, decomposes at a pH of between about 7.5 and 9, and does not generate free oxygen which would inhibit polymerisation. Preferred are ammonium carbonate, ammonium bicarbonate, ammonium carbamate; and the like. Metallic carbonates can also be used where the presence of the residual metal oxide will have no adverse effect.

It is an advantage of this invention that by controlling the temperature and pressure the decomposition rate of the gas generating substance is controlled. The foaming reaction could then be triggered by the increase in temperature associated with the onset of polymerisation. This triggering process requires control over the dispersion temperature and pressure prior to the onset of polymerisation and the use of a catalyst. Alternatively the dispersion could be stored at a predetermined pressure and temperature and microwave energy can be used to induce polymerisation and decompose the gas generating substance.

The particles can be derived from a wide variety of materials such as metals, metallic oxides, non-metallic ceramics and cermets. Examples, given for illustration and not limitation, include alumina, cordierite, magnesia, mullite, silica, silicon carbide, silicon nitride, tungsten nitride, zirconia; and the like.

In one optional step, foaming is carded out at atmospheric pressure using ammonium carbonate or the like as the gas generating substance by using an initiator which induces polymerisation at a temperature higher than that at which ammonium persulphate operates. Such initiators are well known. The initiator would be selected by type and concentration to delay the onset of polymerisation until after the foaming agent had decomposed at 60° C. at atmospheric pressure. In another option, the composition contains ammonium persulphate or the like as initiator and the foaming agent is one which decomposes at a temperature lower than that at which the persulphate decomposes. Such agents are well known, e.g. volatile liquids, gases, and halogenated hydrocarbons. In another optional step where the thermally decomposable gas generating substance is a halogenated hydrocarbon the reaction may be carded out under reduced pressure.

The formed porous article may be demoulded, dried and sintered, in known manner. The article may be put to industrial use.

In order that the invention may be well understood it will now be described by way of illustration with reference to the following examples.

EXAMPLE I

Alumina (70 g), a premix solution (21.27 g) comprising ammonium acrylate 29.1%, methylenebisacrylamide 0.9% and the remainder water, and dispersants comprising ammonium salts of polyacrylate solution (1 g) and polymethacrylate (2 g), were mixed with deionized water (5 g) to form a homogeneous slurry. An amount of foaming agent (ammonium bicarbonate) was then mixed with the slurry and allowed to dissolve. This was followed by the addition of initiator (ammonium persulphate) and finally the foam stabilising agent (surfactant—Triton X-100). (TRITON is a trade mark of Union Carbide). The prepared slurry was then transferred to a microwave oven and heated to 70°–80° C. in under one minute to dissociate the ammonium carbonate.

Various tests were conducted adjusting the microwave power setting and the initiator and foaming agent concentrations. The initiator concentrations were varied between 0.3 and 0.075 g per sample. The foaming agent concentration was varied between 1 g and 3 g per sample. It was found that the addition of the foaming agent did not interfere with the quality of the ceramic slurry. The ammonium bicarbonate crystals mixed in the slurry tended to settle to the bottom of the container. During the application of microwaves, the crystals in the bottom of the container tended to decompose when the temperature approached 60° C. and created a gas pocket at the bottom of the container. The ammonium bicarbonate dissolved within the slurry decomposed to create small gas bubbles which grew and became interconnected with increasing temperature. After foam production the foamed samples were dried at room temperature for 1 day and then at 60° C. for 1 day. This was then followed by sintering at 1550° C. for 2 h. Table I shows the green and sintered densities obtained in the case of some samples.

EXAMPLE II

Alumina, premix solution and dispersants were mixed as in Example I. The foaming agent (ammonium carbonate) was ground to a fine powder and mixed in the slurry. This was followed by the addition of initiator (ammonium persulphate) 1.2 g. The foam stabilising agent (surfactant) was then mixed with the slurry and finally a small amount of catalyst (tetramethylethylenediamine) 0.05 ml was added. The slurry was transferred to a vacuum desiccator at room temperature. At a reduced pressure of about 60 mm of mercury, the slurry started to decompose which resulted in it foaming. This behaviour was quite unexpected and it seems that the ammonium carbonate was decomposing and generating gas.

With the onset of polymerisation the foam expanded even further as the temperature of the gas increased. This required the pressure within the vacuum chamber to be increased to compensate for the expanding foam. After a few minutes polymerisation was complete and the pressure within the chamber was brought back up to atmospheric and the polymerised foam removed from the chamber. The result was a ceramic foam with an extremely open pore structure and low density. The foamed samples were dried at room temperature for 1 day and then at 60° C. for 1 day. This was then followed by sintering at 1550° C. for 2 h. Table II shows the green and sintered density obtained for one sample.

EXAMPLE III

Alumina (75 g), a premix solution (21.27 g) comprising ammonium acrylate (29.19 g), methylenebisacrylamide (0.9%) and the remainder water, and dispersants comprising ammonium salts of polyacrylate solution (1 g) and polymethacrylate (2 g) were mixed with deionized water (0.73 g) to form a homogeneous slurry. To this slurry was added sodium dodecylsulphate (0.15 g) and ammonium persulphate (0.1 g). The mix was stirred for 10 minutes. A fluorocarbon FORANE 141 B DGX; (FORANE is a trade mark of EIF) (8 g) was added with a gas stabilising substance, TERGITOL TMN 10. (0.15 g). (TERGITOL is a trade mark of Union Carbide). The mix was stirred for 1 minute and then placed in a domestic microwave oven. The applied microwave energy cause the fluorocarbon composition to decompose at approximately 32° C. resulting in the foaming of the slurry. As the temperature continues to rise the ammonium persulphate is activated to cause polymerisation of the foamed slurry. After a few minutes the foamed slurry became sufficiently rigid to be demoulded. The green and sintered density is shown in Table III.

EXAMPLE IV

The procedure of Example III was repeated except that 3 g of the fluorocarbon composition was used. The green and sintered density is also shown in Table III. The content of the gas generating substance is one factor controlling the density of the formed product.

TABLE I

| SAMPLE | GREEN DENSITY (g/cm$^3$) | SINTERED DENSITY (g/cm$^3$) |
|---|---|---|
| 1 | 0.55 | 0.86 |
| 2 | 0.62 | 0.97 |
| 3 | 0.41 | 0.64 |

TABLE II

| Ex II | 0.19 | 0.29 |
|---|---|---|

TABLE III

| Ex III | 0.59 | 0.92 |
|---|---|---|
| Ex IV | 1.50 | 2.35 |

We claim:

1. A method of making a porous refractory article, the method comprising the steps of:
  (a) forming an aqueous dispersion of refractory particles, the dispersion including a polymerizable monomer component which on polymerization generates an exotherm;
  (b) adding a thermally decomposable gas generating substance to step (a) under conditions of temperature and pressures effective to generate a gas;
  (c) adding a polymerization agent comprising an initiator or a catalyst to step (b), thus causing a polymerization reaction to start and produce heat; and
  (d) adjusting the temperature or pressure to cause the gas generating substance to generate the gas before or during polymerization of the monomer component whereby the gas forms bubbles which under the heat of the exotherm interconnect to form an interconnected open pore structure.

2. A method according to claim 1, the gas generating substance is selected from the group consisting of ammonium carbonate, ammonium bicarbonate and ammonium carbamate.

3. A method according to claim 1, wherein both the temperature and pressure are controlled to adjust the decomposition rate of the gas generating substance.

4. A method according to claim 1, wherein microwave energy is used to induce polymerization and the decomposition of the gas generating substance.

5. A method according to claim 1, wherein the gas generating substance is a halogenated hydrocarbon and the decomposition is carried out under reduced pressure.

6. A method according to claim 1, wherein the gas generating agent is ammonium carbonate and the method is carried out at atmospheric pressure using an initiator which induces polymerization.

7. A method according to claim 1, wherein the dispersion contains ammonium persulphate as the initiator and the gas generating agent is one which decomposes at a temperature lower than that at which the persulphate decomposes.

8. A method according to claim 1, wherein the refractory particles are metals, metallic oxides, non-metallic ceramics or cermets.

* * * * *